3,775,365
PRODUCTION OF POLYPROPYLENE FIBERS
Ronald D. Mathis, Taylors, and James S. Dix, Greenville, S.C., assignors to Phillips Petroleum Company, Bartlesville, Okla.
No Drawing. Filed June 14, 1972, Ser. No. 262,784
Int. Cl. C08f 45/08
U.S. Cl. 260—41 R  5 Claims

ABSTRACT OF THE DISCLOSURE
A method of producing improved polypropylene fibers which involves incorporating into the polymer a conductive, furnace carbon black as a pigment.

---

This invention relates to polypropylene fibers.

In one of its more specific aspects, this invention relates to improved polypropylene fibers.

The production of polymeric fibers such as those made from polyolefins is well known. Such fibers, which are frequently comprised of polypropylene, often contain flame retardants, ultraviolet light stabilizers and colorants. In the production of the darker shades of such fibers, the carbon black incorporated in the polymer sometimes appears to contribute to the degradation of the fiber, particularly in the presence of certain flame retardants.

It has now been discovered that blacks of a particular description produce superior results when employed in such polymeric compositions in that such degradation is avoided.

According to this invention there is provided a method of producing a polypropylene composition which comprises incorporating into polypropylene a furnace carbon black having dibutylphthalate absorption value within the range of from about 175 to about 350 cc./100 g. black, a nitrogen surface area value within the range of from about 190 to about 300 square meters/g. and a specific resistivity value within the range of from about 0.2 to about 0.9 ohm-cm. This invention also provides the polypropylene composition.

The method of this invention, in general, employs conductive furnace carbon blacks as the pigmenting agent in flame retarded polypropylene compositions. The improved properties of the polymers produced by this invention are manifested by the improved values of melt flow.

This invention is employable with all polypropylene compositions including fibers, sheets and the like. The invention is also employable in all such polypropylene compositions, regardless of the inclusion of the nature of other components, including flame retardants, stabilizers, supplementary colorants and the like. Melt flows of such compositions are variable but often range from about 0.05 to about 30.

The carbon blacks employable in this invention will be furnace blacks having a structure, as measured by dibutylphthalate absorption (DBP, cc./100 g.), within the range of from about 175 to about 350, a nitrogen surface area ($N_2SA$, m.$^2$/g.), within the range of from about 190 to about 300, and a specific resistivity within the range of from about 0.2 to 0.9 ohm-cm. at 150 p.s.i.g. These blacks will also preferably have an average particle diameter within the range of about 25 to about 35 millimicrons.

These blacks can be employed in any desired quantity necessary to impart the desired color. Generally, they will be incorporated in amounts within the range of from about 0.01 to about 3.0 parts per 100 parts polymer (php.). They can be incorporated into the composition in the usual manner in which pigments are conventionally incorporated in polyolefin compositions.

Blacks possessing the properties defined and suitable for employment in this invention are commercially available.

The method of this invention is illustrated by the following:

A resin formula was comprised of 3 melt flow polypropylene, 2 php. of a commercial flame retardant, 1 php. $Sb_2O_3$, 0.5 php. of a phenolic stabilizer, 0.6 php. of a color inhibitor, 0.05 php. of a corrosion inhibitor, 0.4 php. of an ultraviolet light stabilizer and 0.1 php. of a phenolic stabilizer, all of these components being commercially available and conventionally employed in polymeric compositions, all parts being by weight.

Carbon blacks having the properties indicated below, were individually added to like portions of this resin formula in amounts of 0.8 php., and the mixtures were similarly processed to incorporate the blacks. All portions were maintained in the melt indexer at 490° F. and a one minute cut was taken at the end of 5 and 10 minutes total residence time. Using a weight of 268.5 g., cuts were taken and were as follows:

| Black | Nitrogen S.A., m.²/g. | DBP structure | Spec. resistivity, ohm-cm. | Wt. of one min. cut, 490° MF, g. 5 min. | 10 min. |
|---|---|---|---|---|---|
| Channel | 114 | 90 | 0.356–0.557 | 0.163 | 0.286 |
| Acetylene | 64.5 | 212 | 0.418 | 0.103 | 0.400 |
| Furnace | 220 | 200 | 0.575 | 0.055 | 0.111 |
| Do | 125–200 | 106 | | 0.101 | 0.233 |
| Do | 80 | 110 | 0.22 | 0.155 | 0.497 |
| Do | 45 | 120 | 0.20 | 0.087 | 0.414 |

While the method of obtaining the above values is an arbitrary one, the values indicated, nevertheless, are comparative and indicative of melt flow, the smaller the value, the better the composition for usual purposes.

It is seen from the above data that the furnace black having the properties defined acts to produce polymer compositions of improved values over those produced employing other channel and acetylene blacks.

The furnace black, indicated above as being operable in the method of this invention, evidences a similar improvement when incorporated in polypropylene which is spun into fibers.

It will be evident from the foregoing that various modifications can be made to the method of this invention. Such are considered, however, to be within the scope of the invention.

What is claimed is:

1. A method of producing a melt stabilized flame retarded polypropylene composition which comprises incorporating in a flame retarded polypropylene an effective melt stabilizing amount of 0.01 to about 3.0 php. by weight of a conductive furnace carbon black having dibutylphthalate absorption value within the range of from about 175 to about 350 cc./100 g., a nitrogen surface area value within the range of from about 190 to about 300 m.$^2$/g. and a specific resistivity value within the range of from about 0.2 to about 0.9 ohm-cm.

2. The method of claim 1 in which said carbon black has an average particle diameter within the range of from about 25 to about 35 millimicrons.

3. The method of claim 1 in which said flame retarded polypropylene also contains a phenolic stabilizer, a color inhibitor, a corrosion inhibitor, and an ultraviolet stabilizer.

4. The method of claim 1 in which said polypropylene has a melt flow of about 3 and said carbon black is incorporated in said polypropylene in the amount of about 0.8 php.

5. The melt stabilized flame retarded polypropylene composition produced according to claim 3 in which said carbon black has an average particle diameter within the range of from about 25 to about 35 millimicrons.

References Cited

UNITED STATES PATENTS 3,422,056   1/1969   Carton et al. _____ 260—41

LEWIS T. JACOBS, Primary Examiner